(No Model.)
D. A. HENDERSON.
PIPE WRENCH.
No. 588,991.  Patented Aug. 31, 1897.
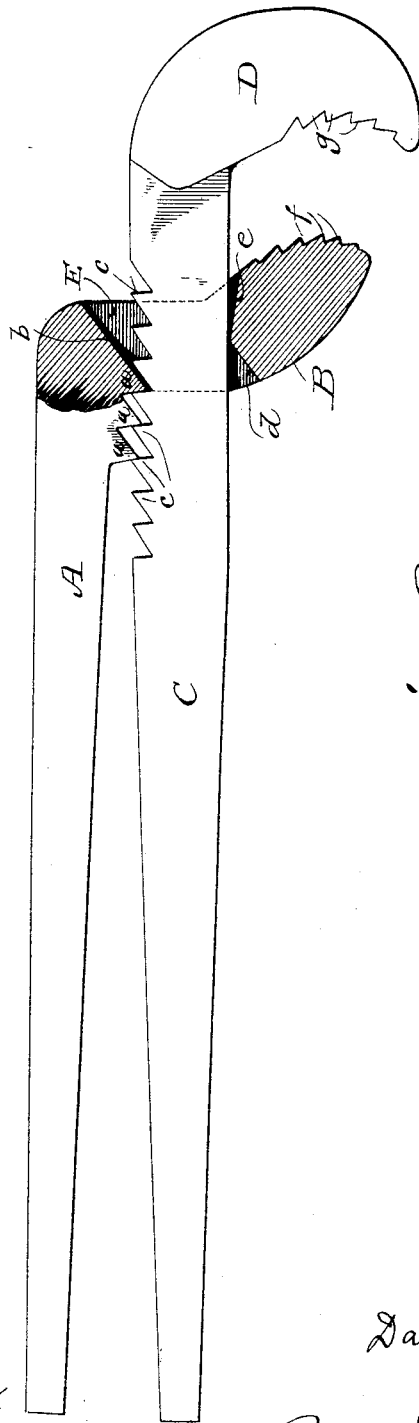
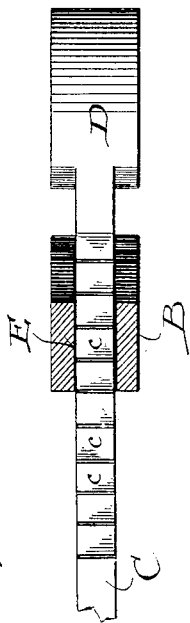
Witnesses:
Geo. N. Young,
B. C. Roloff.
Inventor:
David A. Henderson
By H. G. Underwood
Attorney
THE NORRIS PETERS CO., PHOTO-LITHO., WASHINGTON, D. C.

UNITED STATES PATENT OFFICE.

DAVID A. HENDERSON, OF FOND DU LAC, WISCONSIN.

PIPE-WRENCH.

SPECIFICATION forming part of Letters Patent No. 588,991, dated August 31, 1897.

Application filed August 3, 1896. Serial No. 601,492. (No model.)

*To all whom it may concern:*

Be it known that I, DAVID A. HENDERSON, a citizen of the United States, and a resident of Fond du Lac, in the county of Fond du Lac and State of Wisconsin, have invented certain new and useful Improvements in Pipe-Wrenches; and I do hereby declare that the following is a full, clear, and exact description thereof.

My invention relates to pipe-wrenches; and it consists in certain peculiarities of construction and combination of parts, as will be fully set forth hereinafter, and subsequently claimed.

In the drawings, Figure 1 is a plan view of my improved device, partly broken away or in section to better illustrate certain details of construction. Fig. 2 is a view of the upper part of one of the shanks and its jaw, taken at a right angle to the position shown in the preceding figure, with the jaw of the other shank in section.

Referring to the drawings, A represents one of the shanks of my wrench, and B its jaw. C is the other shank, and D its jaw. The shank A is provided with one or more teeth $a$, (three being shown in the present illustration,) and the shank C with a series of teeth $c\ c$ for engagement therewith. The jaw B is provided with an obliquely-disposed slot E for the reception of the shank C, said slot having flat side walls and its rear end wall $b$ being inclined upward and backward, while the lower part of its front end wall is similarly inclined, as shown at $d$, above which said wall is inclined slightly in the opposite direction or forward, as shown at $e$. The upper or operative face of the jaw B is convexo-elliptical in shape and provided with forward and upward projecting teeth $f\ f$, and the under and operative face of the jaw D is concavo-elliptical in shape and provided with backward and downward projecting teeth $g\ g$. Further than this the outer end of the jaw D terminates in an overhanging inward-projecting lip having a greater lateral projection from the line of the shank C than that of the jaw B when the two parts of the wrench are put together, so that in practice the jaw D closes over the pipe between it and the jaw B, this being further aided by the fact that the teeth of the jaw D are arranged on a curved line within or above a like line drawn from said lip. As the teeth on jaw B are arranged on a convex line, the pipe is gripped with only a slight movement of the shanks A C, and this overhanging construction of the lip at the end of the jaw D is of great importance in the secure holding of the pipe being gripped.

My wrench is manipulated with one hand only, and the peculiar shape and projection of the jaws are such as to utilize this tool to great advantage in places where the ordinary styles of wrenches would be of little service.

The operation of my improved device will be readily understood from the foregoing description of its construction, taken in connection with the accompanying drawings. In use one of the teeth $a$ serves as a fulcrum-point for the shank C, the said tooth $a$ being inserted between two adjacent teeth $c\ c$ of said shank C, as shown in the drawings. The entire device consists of the two parts shown, without springs or attachments of any kind, and said parts are put together by slipping the shank C obliquely through the slot E in the jaw B, and the necessary adjustment, according to the diameter of the pipe or other article being operated upon, is obtained in the same manner—that is, by obliquely sliding the jaw C back or forth in said slot to the required point and then bringing the two shanks A and C together, with the latter shank C fulcrumed upon a tooth $a$ of the former shank. By reason of the shape and the inclination of the teeth of the jaws B D the pipe or other article gripped between said jaws will be held very firmly until the shank C is released from proximity to the shank A, while at the same time providing for a ready and instant adjustment.

Having thus described my invention, what I claim as new, and desire to secure by Letters Patent, is—

1. An adjustable pipe-wrench comprising a toothed shank terminating in a laterally-projecting stationary convex-faced toothed jaw, having an obliquely-disposed slot therethrough, one end wall of which slot extends in opposite directions from about its center, and the bottom of the other end wall of said slot forms the first tooth on said shank, in combination with another shank, passing through said slot and having teeth in engagement with the teeth on the first-named shank, and terminating in a transverse stationary concave-faced toothed jaw, projecting to a line beyond that of the projection of the described slotted jaw, substantially as set forth.

2. An adjustable two-part pipe-wrench, consisting of a toothed shank terminating in a transverse stationary curved jaw, having teeth on its under concave operative face and an overhanging inward-projecting lip at its extreme edge, in combination with another toothed shank, terminating in a transverse stationary slotted curved jaw projecting to a line within the line of projection of the said first-named jaw, and having teeth upon its convex operative face and the slot in said last-named jaw being obliquely disposed therethrough for the reception of the other toothed shank, the bottom of the wall of said slot adjacent to the teeth on said other shank terminating in a tooth forming the upper or first tooth of this shank, and the opposite wall of said slot, adjacent to the smooth or straight side of said other shank, extending in opposite directions from about its center and being free from teeth, substantially as set forth.

In testimony that I claim the foregoing I have hereunto set my hand, at Milwaukee, in the county of Milwaukee and State of Wisconsin, in the presence of two witnesses.

DAVID A. HENDERSON.

Witnesses:
  H. G. UNDERWOOD,
  B. C. ROLOFF.